(12) United States Patent
Wang et al.

(10) Patent No.: US 11,397,563 B2
(45) Date of Patent: Jul. 26, 2022

(54) PROGRAMMING A PROTECTION DEVICE FOR A MOLDING MACHINE

(71) Applicant: HUSKY INJECTION MOLDING SYSTEMS LTD., Bolton (CA)

(72) Inventors: Zhiming Wang, Woodbridge (CA); Menny Deutsh, Thornhill (CA); Richard Karner, Holland Landing (CA)

(73) Assignee: Husky Injection Molding Systems Ltd., Bolton (CA)

( * ) Notice: Subject to any disclaimer, the term of this patent is extended or adjusted under 35 U.S.C. 154(b) by 113 days.

(21) Appl. No.: 16/628,443

(22) PCT Filed: Jun. 11, 2018

(86) PCT No.: PCT/CA2018/050694
§ 371 (c)(1),
(2) Date: Jan. 3, 2020

(87) PCT Pub. No.: WO2019/014749
PCT Pub. Date: Jan. 24, 2019

(65) Prior Publication Data
US 2020/0215735 A1    Jul. 9, 2020

Related U.S. Application Data

(60) Provisional application No. 62/535,358, filed on Jul. 21, 2017.

(51) Int. Cl.
*G06F 8/34* (2018.01)
*B29C 45/80* (2006.01)
(Continued)

(52) U.S. Cl.
CPC ............ *G06F 8/34* (2013.01); *B29C 45/80* (2013.01); *G05B 19/409* (2013.01);
(Continued)

(58) Field of Classification Search
CPC .......... B29C 45/84; B29C 2945/76648; B29C 2945/76913; B29C 45/80;
(Continued)

(56) References Cited

U.S. PATENT DOCUMENTS 5,375,991 A     12/1994 Rydmann et al.
5,493,503 A *    2/1996 Richards ................. B29C 45/76
                                                       264/40.5
(Continued)

FOREIGN PATENT DOCUMENTS

DE     102010046274 A1    3/2012
EP         0269204 A2     6/1988
(Continued)

OTHER PUBLICATIONS

English Machine Translation of Foreign Reference WO-2012038491-A1, 2012 (Year: 2012).*

(Continued)

*Primary Examiner* — Nicholas Ulrich

(57) ABSTRACT

A system for programming a protection device for a molding machine includes a controller for actuating a plurality of molding machine actuators in an actuation sequence, each distinct actuation constituting a respective machine component actuation of an associated machine component. An HMI is operable to: present a GUI specific to a chosen machine component actuation; and for each of a plurality of other machine component actuations, define within the GUI, based on operator input, a rule specifying a state of the chosen machine component actuation relative to a state of the other machine component actuation for preventing interference between the two machine component actuations. The controller is configured, based on the rules defined within the GUI, to trigger an action, upon violation of any one of the rules, for reducing a risk of interference between (Continued)

the chosen machine component actuation and a respective one of the other machine component actuations.

29 Claims, 12 Drawing Sheets

(51) Int. Cl.
| | |
|---|---|
| *G05B 19/409* | (2006.01) |
| *G06F 3/0484* | (2022.01) |
| *G06F 3/0481* | (2022.01) |
| B29C 45/56 | (2006.01) |
| B29C 45/76 | (2006.01) |
| B29C 45/84 | (2006.01) |
| *G06F 113/22* | (2020.01) |

(52) U.S. Cl.
CPC .......... *G06F 3/0481* (2013.01); *G06F 3/0484* (2013.01); *B29C 45/561* (2013.01); *B29C 45/7626* (2013.01); *B29C 45/84* (2013.01); *B29C 2045/7606* (2013.01); *B29C 2945/76083* (2013.01); *B29C 2945/76381* (2013.01); *B29C 2945/76939* (2013.01); *G06F 2113/22* (2020.01)

(58) Field of Classification Search
CPC ........... B29C 2945/76933; B29C 2945/76936; B29C 45/768; B29C 45/766; B29C 2043/5833; B29C 2043/5841; B29C 2043/5858; B29C 2043/585; B29C 45/762; G06F 3/04817; G06F 3/0482; G06F 3/04845; G06F 3/04847; G06F 2113/22; G06F 3/0481; G06F 3/0484; G06F 30/23; G06F 30/17; G06F 30/20; G06F 8/34; G05B 2219/49157; G05B 19/4061; G05B 2219/45244; G05B 2219/35316; G05B 2219/37237; G05B 2219/49153; G05B 19/409

See application file for complete search history.

(56) References Cited

U.S. PATENT DOCUMENTS

| | | | |
|---|---|---|---|
| 6,432,334 | B1 | 8/2002 | Keller |
| 6,925,354 | B2* | 8/2005 | Morwald ................ B29C 45/76 |
| | | | 156/125 |
| 9,937,650 | B2* | 4/2018 | Dimmler .............. G05B 19/409 |
| 2003/0075818 | A1 | 4/2003 | Morwald et al. |
| 2006/0157880 | A1 | 7/2006 | Hehl |
| 2008/0031992 | A1 | 2/2008 | Matsuo et al. |
| 2019/0358879 | A1* | 11/2019 | Taruya .................. B22D 17/32 |

FOREIGN PATENT DOCUMENTS

| | | | |
|---|---|---|---|
| JP | 58116138 | A | 7/1983 |
| JP | 3207628 | A | 9/1991 |
| JP | 2015033793 | A | 2/2015 |
| WO | 9213311 | A1 | 8/1992 |
| WO | 2011063439 | A1 | 6/2011 |
| WO | WO-2012038491 | A * | 3/2012 ........... B29C 45/762 |

OTHER PUBLICATIONS

PCT International Search Report; Cuerrier, Pierre; dated Jul. 13, 2018, 2 pages.

SPI Pendant Interface Manual, Product Manual [online], Yaskawa America, Inc., 2015 [retrieved on Jul. 11, 2018], retrieved from <https://cdn2.hubspot.net/hubfs/366775/downloads/documentation/172881-1 CD.pdf?t=1469555590506>.

"Selogica—the control unit for all Allrounder injection moulding machines", XP002305034 May 1, 2002.

* cited by examiner

DATA STRUCTURE 800

802

| ID | Machine Component | Actuation | Machine protection rules |
|---|---|---|---|
| A | Ejector | Forward | Subordinate data structure 820 |
| B | Ejector | Back | Subordinate data structure 840 |
| C | In-Mold Closing Device | Forward | Subordinate data structure 860 |
| D | In-Mold Closing Device Back | Back | Subordinate data structure 880 |
| E | Mold Stroke | Opening | N/A |
| F | Mold Stroke | Closing | N/A |

820

| ID | Own state | Own position | Operator | Other Component - Actuation | Other State | Other position |
|---|---|---|---|---|---|---|
| G | Position | 1.0 | After | Mold Stroke - Opening | Position | 10.0 |
| H | Completed | N/A | After | Mold Stroke - Opening | Position | 60.0 |

840

| ID | Own state | Own position | Operator | Other Component - Actuation | Other State | Other position |
|---|---|---|---|---|---|---|
| I | Completed | N/A | Before | Mold Stroke - Closing | Position | 100.0 |

860

| ID | Own state | Own position | Operator | Other Component - Actuation | Other State | Other position |
|---|---|---|---|---|---|---|
| J | Position | 20.0 | After | Mold Stroke - Opening | Position | 80.0 |
| K | Position | 130.0 | After | Mold Stroke - Opening | Position | 150.0 |
| L | Position | 130.0 | After | Ejector - Forward | Complete | N/A |

880

| ID | Own state | Own position | Operator | Other Component - Actuation | Other State | Other position |
|---|---|---|---|---|---|---|
| M | Position | 180.0 | Before | Stripper - Forward | Complete | N/A |
| N | Position | 20.0 | Before | Mold Stroke - Closing | Position | 150.00 |

FIG. 8

PROGRAMMING A PROTECTION DEVICE FOR A MOLDING MACHINE

TECHNICAL FIELD

The present disclosure relates to molding machines, and in particular to programming a protection device for a molding machine.

BACKGROUND

A molding machine may have many independently actuatable components whose actuation must be precisely coordinated to prevent interference between the components. Interference between machine components occurs when one machine component obstructs movement of another or when the two components collide. Interference between machine components may also be considered to occur when a molded article associated with a machine component obstructs, or is obstructed by, another machine component, or when a molded article associated with one machine component collides with another machine component. Interference between machine components is generally undesirable as it may result in damage to the machine, lost productivity or machine down-time.

One example of a molding machine having multiple independently actuatable components is an injection molding machine for molding a preform. This type of injection molding machine typically includes a mold with two complementary halves: a first mold half having a female cavity piece and a second mold half having a male core piece.

During a first stage of a molding sequence, the two mold halves are mated and clamped, with the female cavity piece and the male core piece collectively defining a preform-shaped molding cavity. Melted molding material is injected into the molding cavity and then cooled until the molding material hardens.

During a second stage of the molding sequence, the mold halves are separated from one another for molded article (preform) removal. Because cooling typically causes the molded article to shrink within the molding cavity, the molded article may remain associated with the core piece of the mold when the mold halves are separated. To facilitate ejection, an ejection mechanism such as a stripper sleeve or ejector pin may be actuated to dislodge the molded article from the core piece.

Premature actuation of the ejection mechanism could cause the actuated machine component (the stripper sleeve or ejector pin), or the ejected preform, to undesirably collide or otherwise interfere with another mold component, such as the opposing mold half. Such interference could result in damage to the preform or machine components and may force the molding machine to be shut down.

To guard against such eventualities, a protection device may be used to ensure that the mold halves have separated by a sufficient amount before the ejection mechanism is activated. A protection device may for example take the form of a controller that has been programmed to coordinate actuation of the molding machine components to avoid interference. Whenever an interference arises, e.g. due to variations in cycle times or incremental changes in relative component positions over successive machine cycles, the protection device (controller) may stop the machine to avoid possible damage thereto.

An ejection mechanism is one example of a component of a molding machine whose actuation may warrant coordination with that of other machine components to avoid interference, but many other examples of such machine components exist. For instance, some molding machines employ a take-off device or "end-of-arm tool" to facilitate removal and cooling of freshly molded articles from a mold half. Relative movement between the mold halves and the take-off device may warrant precise control to avoid interference between them. Other independently actuatable injection molding machine components include stripping devices (e.g. stripper sleeves or stripper rings) and multi-position mold cores.

Beyond injection molding machines, other molding machines having independently actuatable machine components whose actuation may warrant precise control to avoid interference may include compression molding machines, injection-compression molding machines, and blow-molding machines.

Conventional mechanisms for programming a protection device (e.g. controller) to guard against machine component interference may be cumbersome, e.g. requiring specialized knowledge of programming languages used for programming programmable logic controllers (such as IEC 61131-3), or may be very specific ("hard-coded") to a particular molding machine implementation.

SUMMARY

According to one aspect of the present disclosure, there is provided a system comprising: a controller for actuating a plurality of actuators of a molding machine in an actuation sequence, each distinct actuation of one of the actuators during the actuation sequence constituting a respective machine component actuation of an associated machine component; and a human-machine interface 'HMI' operable to: present a graphical user interface 'GUI' specific to a chosen machine component actuation; and for each of a plurality of other machine component actuations, define within the GUI, based on operator input, a rule specifying a state of the chosen machine component actuation relative to a state of the other machine component actuation for preventing interference between the two machine component actuations; wherein the controller is configured, based on the rules defined within the GUI, to trigger an action, upon violation of any one of the rules, for reducing a risk of interference between the chosen machine component actuation and a respective one of the other machine component actuations.

In another aspect of the present disclosure, there is provided a method of programming a controller for a molding machine, the controller for actuating a plurality of actuators of the molding machine in an actuation sequence, each distinct actuation of one of the actuators during the actuation sequence constituting a respective machine component actuation, the method comprising: presenting a graphical user interface 'GUI' specific to a chosen machine component actuation; for each of a plurality of other machine component actuations, defining within the GUI, based on operator input, a rule specifying a state of the chosen machine component actuation relative to a state of the other machine component actuation for preventing interference between the two machine component actuations; and configuring the controller, based on the rules defined within the GUI, to trigger an action, upon violation of any one of the rules, for reducing a risk of interference between the chosen machine component actuation and a respective one of the other machine component actuations.

In some embodiments, the action is interrupting the actuation sequence or generating a user notification at the HMI.

In some embodiments, the GUI comprises a table and each rule is represented as a row within the table.

In some embodiments, each rule specifies a temporal relationship between the state of the chosen machine component actuation and the state of the other machine component actuation for preventing interference between two machine component actuations. The temporal relationship may be expressed using a BEFORE or AFTER operator.

In some embodiments, the state of the chosen machine component actuation is expressed, within the GUI, as a position of the associated machine component actuated by the chosen machine component actuation, e.g. as an offset from a reference position of the machine component.

In some embodiments, the state of the other machine component actuation is expressed, within the GUI, as a position of the associated machine component actuated by the other machine component actuation, e.g. as an offset from a reference position of the other machine component In some embodiments, the state of the chosen machine component actuation or the state of the other machine component actuation is expressed, within the GUI, as completed.

In some embodiments, the molding machine is an injection molding machine and the plurality of other machine component actuations are selected from a set of machine component actuations comprising: mold opening; mold closing; ejector forward; ejector back; stripping device forward; stripping device back; take-off device forward; take-off device back; mold core moving from a first molding position to a second molding position; and mold core moving from the second molding position to the first molding position.

In another aspect of the present disclosure, there is provided a computer-readable medium storing instructions that, when executed by a processor of a computing device associated with a controller of a molding machine, the controller operable to actuate a plurality of actuators of the molding machine in an actuation sequence, each distinct actuation of one of the actuators during the actuation sequence constituting a respective machine component actuation, cause the processor to: present a graphical user interface 'GUI' specific to a chosen machine component actuation; for each of a plurality of other machine component actuations, define within the GUI, based on operator input, a rule specifying a state of the chosen machine component actuation relative to a state of the other machine component actuation for preventing interference between the two machine component actuations; and
configure the controller, based on the rules defined within the GUI, to trigger an action, upon violation of any one of the rules, for reducing a risk of interference between the chosen machine component actuation and a respective one of the other machine component actuations.

In some embodiments, the controller is part of the computing device.

Other features will become apparent from the drawings in conjunction with the following description.

DESCRIPTION OF THE DRAWINGS

In the figures, which illustrate non-limiting example embodiments:

FIG. 8 is a schematic depiction of a data structure generated by the system of FIG. 1 that may be used for programming the protection device of the molding machine.

DETAILED DESCRIPTION OF THE NON-LIMITING EMBODIMENT(S)

Figure 1:
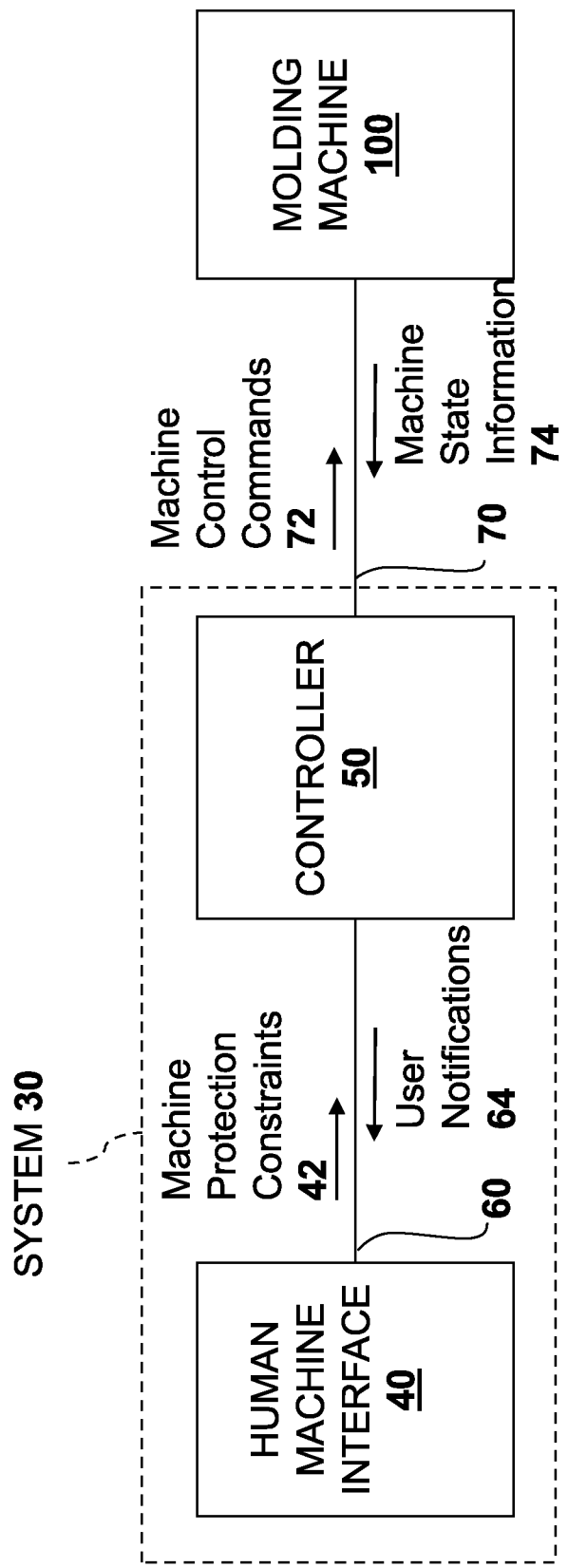
FIG. 1 is a schematic diagram of a system for programming a protection device for a molding machine.

In the description that follows, terms such as "upper," "lower," "lowermost," "forward," and "back," used with respect to system components in the drawings should not be understood to necessarily connote a particular orientation of the components during use.

Figure 5:
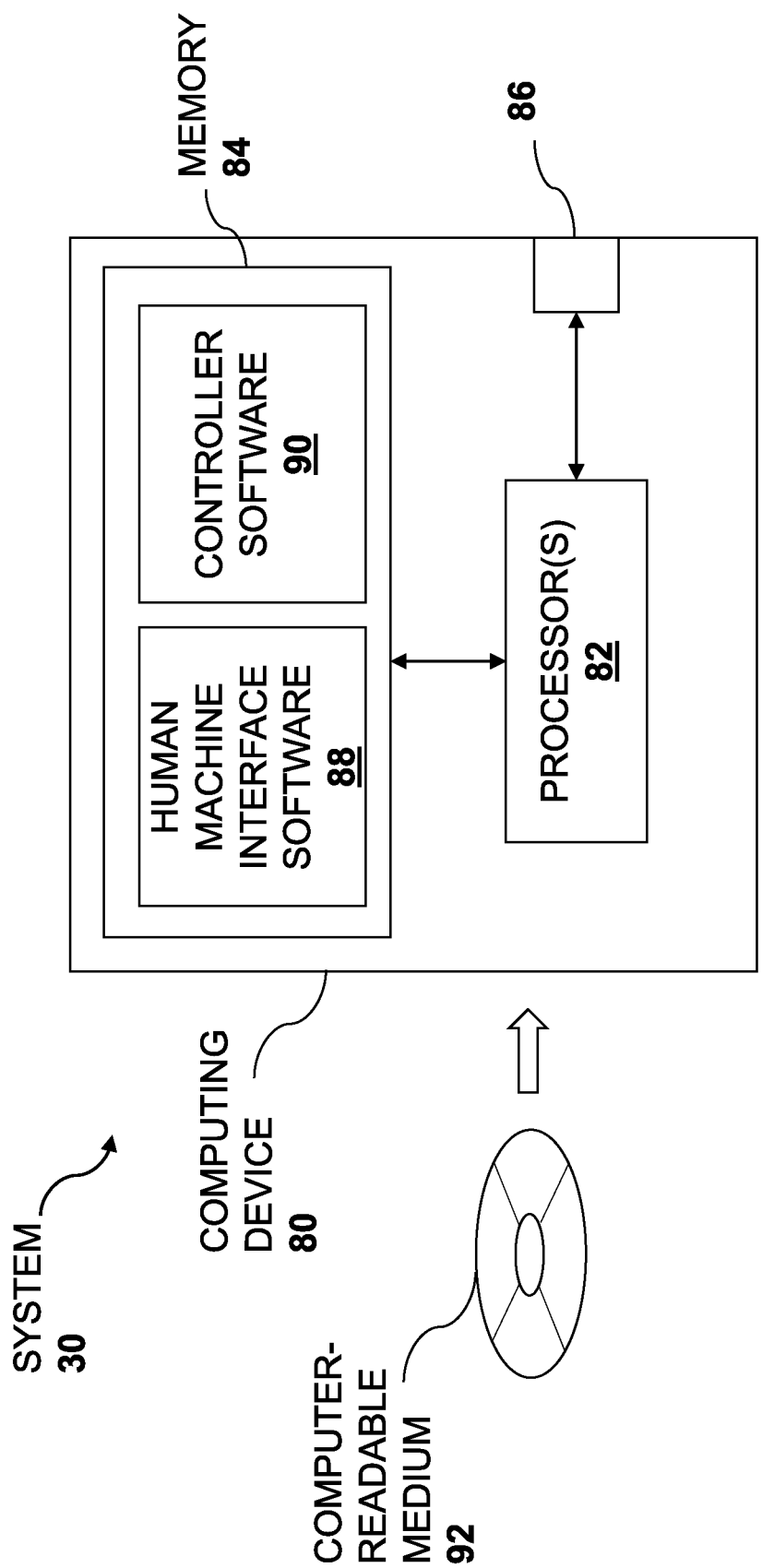
FIG. 5 is a schematic diagram of a computing device that may be used to implement the system of FIG. 1.

FIG. 1 schematically depicts a system 30 for programming a protection device of a molding machine 100. The system 30 includes a human machine interface 40 operatively coupled to a controller 50. The system 30 may be effected using a single computing device, e.g. as depicted in FIG. 5 (described below), or using multiple computing devices.

The human machine interface (HMI) 40 is a mechanism that allows a human operator to enter user input for specifying machine protection constraints 42 in the manner described below. A machine protection constraint is a rule regarding a state of actuation of one machine component relative to a state of actuation of another component for avoiding an interference between the machine components. In this description, all references to interference between (molding) machine components should be understood to include interference between associated molded articles and machine components. The HMI 40 may also have other related functions, such as displaying an operational state of molding machine 100 and presenting user notifications regarding possible or actual interference between machine components arising during the operation of molding machine 100.

The HMI 40 includes a display, such as a liquid crystal display (LCD), for presenting a graphical user interface (GUI) and a user input mechanism, such as a keyboard and pointing device (e.g. a touchscreen or mouse), for entering user input, none of which are expressly depicted in FIG. 1. Example GUIs that may be presented by the HMI 40 for specifying machine protection constraints are illustrated in FIGS. 7, 9, 10 and 11, described below.

The controller 50 is a control system generally responsible for controlling the operation of molding machine 100. To that end, the controller 50 issues machine control commands 72 to the molding machine 100, including commands for actuating various components of the molding machine 100 in an actuation sequence (e.g. an injection molding sequence or cycle). The commands are communicated from the controller 50 to the molding machine 100 over a connection 70, which may for example be an electrical cable (e.g. a shielded Ethernet category 5e cable). The controller 50 also periodically or continuously receives, via connection 70, machine state information 74 indicative of the operational state of the molding machine 100, such as the current positions of various actuated machine components.

The controller 50 also acts as a protection device for the molding machine 100. In that capacity, the controller 50 continuously monitors the state of various independently actuatable components of molding machine 100 and, upon detection of imminent or actual interference between two or more machine components, takes measures for protecting the molding machine 100. The measures may for example include ceasing the operation of the molding machine 100 or issuing one or more user notifications 64 to an operator of the molding machine 100 urging remedial action. The user notifications may for example be audible alarms, visual indicators, haptic notifications, or combinations of these. The remedial actions may include ceasing operation of the molding machine 100 or effecting other protection measures.

In support of its machine protection function, the controller 50 is configured to receive, from the HMI 40, machine protection constraints 42 indicative of permissible states of actuation of components of the molding machine 100, relative to one another, for avoiding interference between the components. The controller 50 is further designed to configure itself (or, more generally, to be configured), according to the received constraints 42, to perform molding machine protection, as will be described.

In the present embodiment, the molding machine 100 is an injection molding machine for molding a flip-top closure of the type used for closing shampoo bottles for example. The injection molding machine 100 is depicted, in different states of operation, in FIGS. 2, 3, 4A and 4B.

Figure 2:
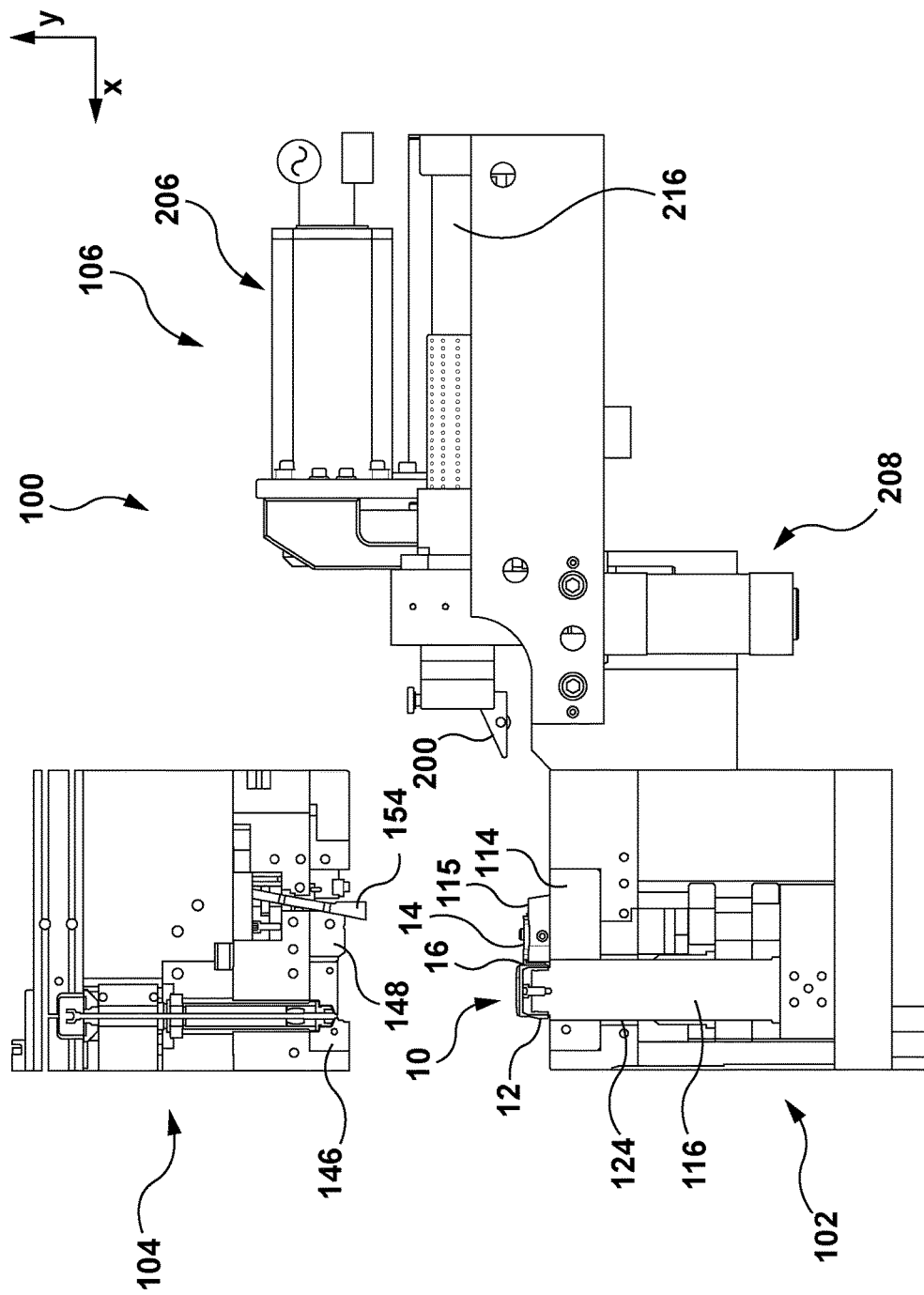
FIG. 2 is partial cross-sectional view of an example molding machine, specifically an injection molding machine for molding a flip-top closure, in conjunction with which the system of FIG. 1 may be used, at a first stage of operation.

Referring to FIG. 2, the example injection molding machine 100 is depicted at a first stage of operation in partial cross-sectional view. As illustrated, the injection molding machine 100 has two mold halves 102 and 104. The first mold half 102, which is movable, includes inserts 114, 115 for defining a lower portion of a flip-top closure 10. The second mold half 104, which is stationary, includes inserts 146, 148 for defining an upper portion of the flip-top closure 10. The closure 10, which is shown in side view in FIG. 2, has a body portion 12 and a lid 14 interconnected by a living hinge 16.

The injection molding machine 100 also has, among other features, four independently actuatable machine components.

The first independently actuatable machine component of molding machine 100 is mold half 102. Mold half 102 reciprocates between a mold open position, as depicted in FIG. 2, and a mold closed position (not expressly shown). In the mold open position, mold half 102 is separated from mold half 104 by a distance D. The mold open position allows the lid 14 of the flip-top closure 10 to be closed and then ejected from the mold. In the mold-closed configuration, mold half 102 abuts mold half 104 so that mold inserts 114, 115 mate with mold inserts 146, 148 respectively, collectively forming a flip-top closure-shaped mold cavity into which molding material may be injected. Actuation of mold half 102 to move away from or towards mold half 104 is referred to as "mold opening" or "mold closing" respectively.

The second independently actuatable machine component of molding machine 100 is ejector 154. Ejector 154 reciprocates between an ejection configuration (shown in FIG. 2) and a molding configuration (not expressly shown). In the molding configuration, the lowermost, flat end of the ejector 154 is substantially flush with mold insert 148 to define a molding surface. The ejector 154 moves from the molding configuration to the ejection configuration as mold half 102 moves away from mold half 104 during mold opening. This is done to urge the lid 14 portion of the flip-top closure 10 off the mold insert 148 and to keep the flip-top closure 10 from separating from opposing mold half 102. The ejector 154 is returned to a molding configuration before the mold is closed. Actuation of ejector 154 from the molding configuration to the ejection configuration is referred to as "ejector forward" actuation. Actuation of ejector 154 in the opposite direction is referred to "ejector back" actuation. The ejector 154 may alternatively be referred to as a "part release pin."

Figure 3:
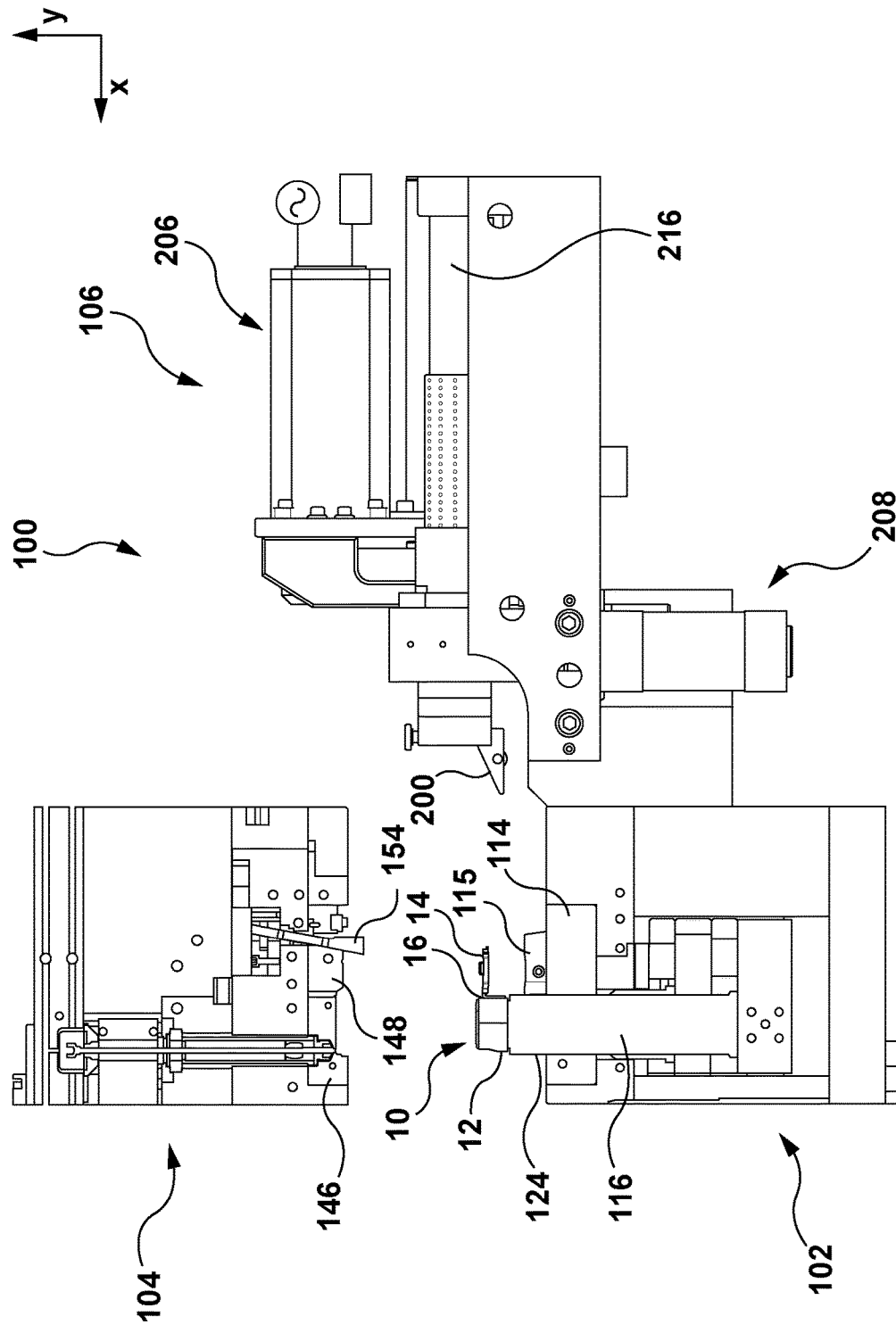
FIG. 3 is a partial cross-sectional view of the injection molding machine of FIG. 2 at a later stage of operation in which machine components are in different states of actuation from what is shown in FIG. 2.

The third independently actuatable machine component of molding machine 100 is stripper ring 124 (a form of stripping device). Stripper ring 124 reciprocates between a retracted configuration, depicted in FIG. 2, and an extended configuration, as shown in FIG. 3 (described below). In the extended configuration, the stripper ring 124 and a core insert 116 move together towards mold half 104, to lift the lid 14 portion of the flip-top closure 10 off mold insert 115 while the core insert 116 continues to support the body portion 12. This is done to position the lid 14 for in-mold closing, described below.

The fourth independently actuatable machine component of molding machine 100 is in-mold lid closing device 106. The in-mold closing device 106 is a mechanism used to close the lid 14 of a freshly molded flip-top closure 10 before ejection of the closure from the mold. The in-mold closing device 106 reciprocates between a retracted or molding configuration, depicted in FIGS. 2 and 3, and a fully extended configuration (not expressly shown). In the retracted configuration, the in-mold closing device 106 is positioned so as not to interfere with the opening or closing of mold half 102.

Figure 4A:
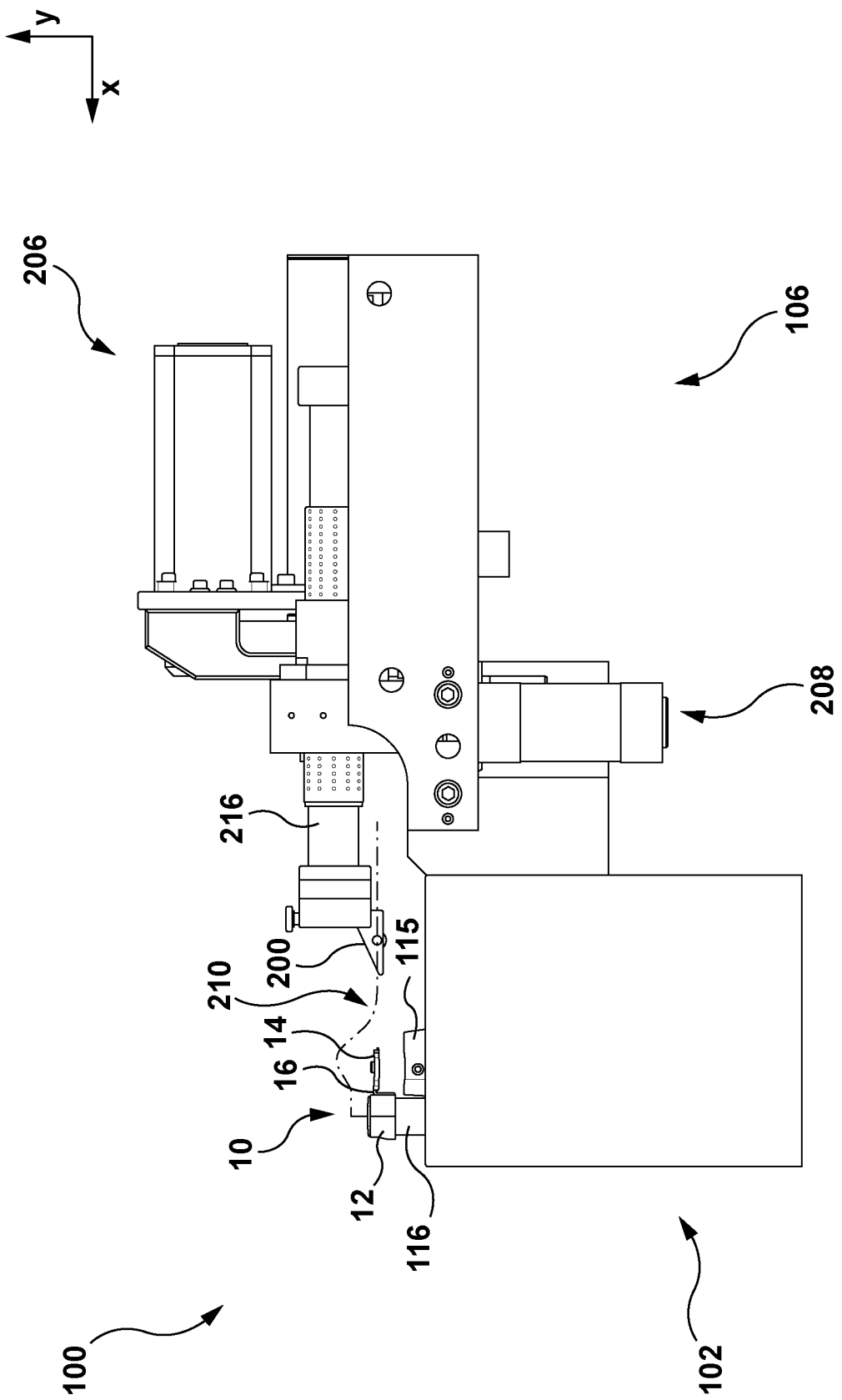
FIGS. 4A and 4B are top views of the injection molding machine of FIG. 2 at two subsequent stages of operation respectively showing in-mold closing component for closing the lid of the flip-top closure at different stages of actuation.
Figure 4B:
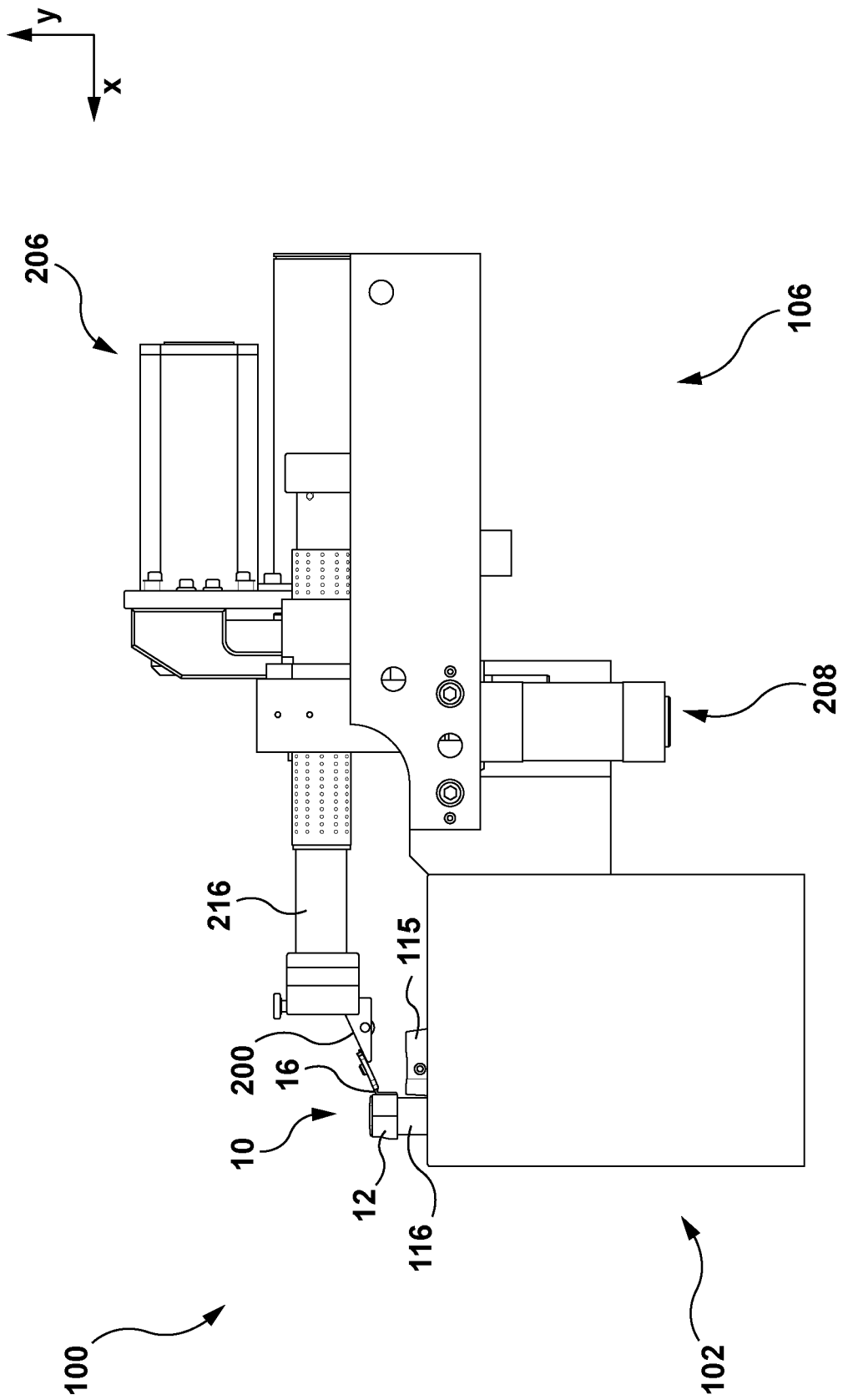

In the fully extended configuration, a lid-closing tool 200 portion of in-mold closing device 106 is extended to close the lid 14 of the flip-top closure 10. As it transitions between the retracted and the fully extended configurations, the in-mold closing device 106 causes the distal lid-closing tool 200 to trace a two-dimensional lid closing path 210 as depicted in FIG. 4A and to engage the lid 14 e.g. as depicted in FIG. 4B (as described below). This is achieved by coordinated actuation of two linear actuators 206, 208 that are offset from one another by ninety degrees.

The four independently actuatable components recited above may be actuated by a variety of different actuators, such as hydraulic, pneumatic, or electric actuators, at least some of which are not expressly depicted in FIGS. 2, 3, 4A, and 4B. In some cases, the actuators may be mechanically coupled to plates to which the actuated components are in turn mechanically coupled. The plates may facilitate simultaneous actuation of many instances of the same machine component within injection molding machine 100, e.g. when machine 100 is configured to a batch of identical flip-top closures 10 in a single molding cycle. The actuators may be referred to as axes.

Referring to FIG. 5, an example computing device 80 that may be used to implement system 30 of FIG. 1 is schematically depicted. The computing device 80 may be an industrial PC including one or more processors 82 in communication with memory 84 and a port 86. The processor(s) 82 may for example be (an) Intel® Xeon® ES-4669 v3 processor(s) or another processor. In some embodiments, the processor is capable of multitasking. The memory 84 may for example be volatile memory (e.g. RAM), non-volatile memory (e.g. a solid state drive), or a combination of the two. The port 86 may for example be Cat5e RJ45 Jack for interconnection of a cable that acts as connection 70 (FIG. 1) between the controller 52 and the injection molding machine 100. The computing device 80 may include other components omitted from FIG. 5 for the sake of clarity.

The memory 84 stores HMI software 88 and controller software 90.

The HMI software 88 is generally responsible for presenting user interface screens for defining one or more machine protection constraints 42, as described below. The HMI software 88 may for example be developed in a high-level programming language such as C++, C #, or visual basic using suitable software libraries and software frameworks.

The controller software 90 is generally responsible for configuring the controller 50 to send appropriate machine control commands 72 (FIG. 1), via port 86 (FIG. 5), to molding machine 100 for controlling machine operation based in part on dynamically received machine state information 74 (FIG. 1). The controller software 90 is also designed to configure controller 50, based on machine protection constraints 42 received from the HMI 40 (FIG. 1), to protect the machine 100 against interference between machine components, as described herein. The controller software 90 may for example be developed using a programming language such as an IEC-61131-3 based language, C, or C++. The software may be suitable for running on a programmable logic controller from a manufacturer such as Beckhoff™, BNR™, Allen Bradley™, or Siemens™ for example.

Either one or both of the HMI software 88 and controller software 90 may be loaded into memory 84 from a tangible computer-readable medium 92 (FIG. 5), which could for example be an optical disk, a thumb drive, a hard drive, or another form of tangible storage medium.

Figure 6:
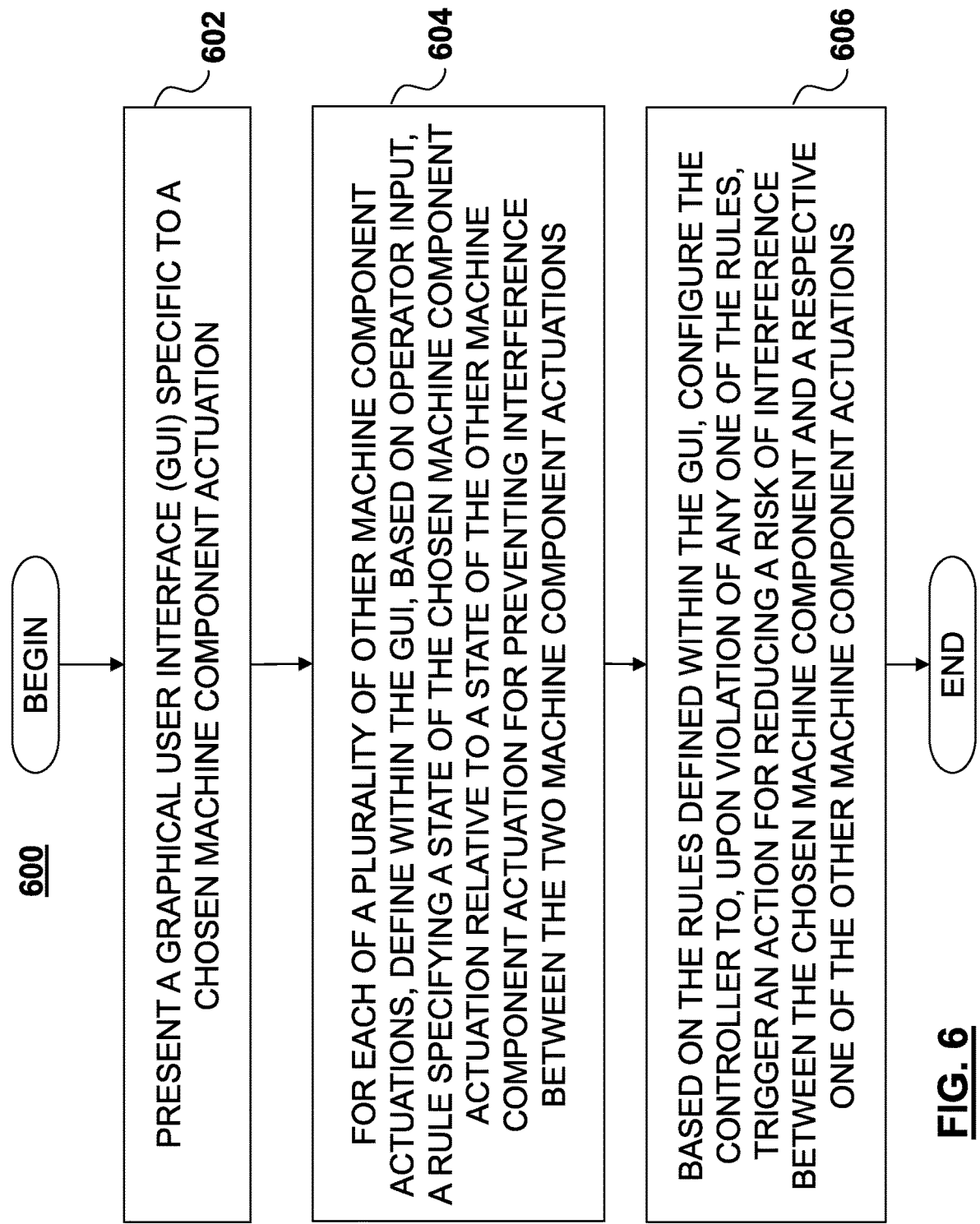
FIG. 6 is a flowchart of operation of the system of FIG. 1 for programming a protection device for a molding machine.

Referring to FIG. 6, operation 600 of system 30 for programming a protection device for a molding machine is depicted in flowchart form. Operation 600 may be triggered by a human operator interacting with the HMI 40 (FIG. 1).

Initially, a graphical user interface (GUI) specific to a chosen machine component actuation is presented (operation 602, FIG. 6). This may be done in response to entry at HMI 40 of a user command for defining machine protection constraints specific to a particular actuation of a chosen machine component.

Figure 7:
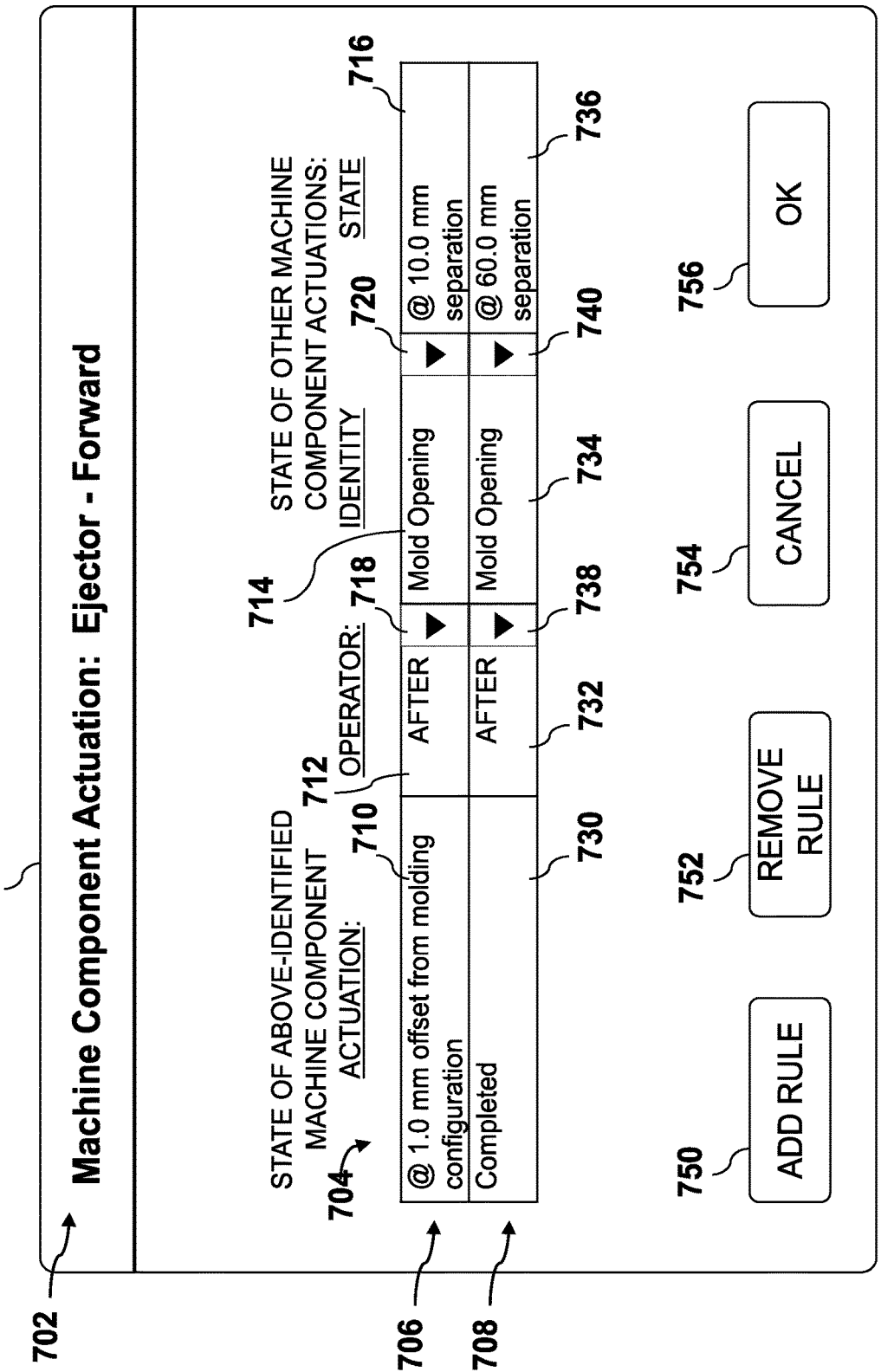
FIG. 7 illustrates an example graphical user interface presented by a human-machine interface of the system of FIG. 1 during the operation of FIG. 6.

An example GUI 700 that may be presented in operation 602 is illustrated in FIG. 7. The example GUI 700 of FIG. 7 comprises a dialog box with a title bar 702. Text in the title bar 702 specifies: (a) the chosen machine component (ejector 154, identified by the text "Ejector"); and (b) a particular actuation of that machine component (forward, as identified by the text "Forward"). In the illustrated embodiment, the textually defined identity of the machine component and the textually defined actuation are separated in title bar 702 by a hyphen character "-". Thus, as should now be apparent from FIG. 7, the illustrated GUI 700 is specific to a particular actuation (forward, e.g. versus backward) of a particular machine component (here, ejector 154).

The example GUI 700 includes a table 704. Each row 706, 708 in table 704 represents a distinct machine protection constraint, i.e. a distinct rule regarding a state of the chosen machine component actuation (here, ejector forward) relative to a state of actuation of another machine component, for enforcement by the protection device (controller 50) to prevent interference between the two machine component actuations (i.e. to prevent interference between the two machine component actuations and/or associated molded articles).

Subsequently, for each of a plurality of other machine component actuations (i.e. for multiple machine component actuations other than the chosen machine component actuation identified in the title bar 702), a rule is defined within the GUI 700, based on operator input. The rule specifies a state of the chosen machine component actuation (which, again, is ejector forward in this example) relative to a state of the other machine component actuation for preventing interference between the two machine component actuations (operation 604, FIG. 6).

For example, the first row 706 of FIG. 7 specifies a rule whereby, to prevent interference between the ejector 154 and opposing mold half 102 (see e.g. FIG. 2), the chosen machine component actuation (ejector forward, as specified in title bar 702) should position the ejector 154 at an offset of 1.0 mm (as specified in field 710), from a reference position, AFTER (field 712) the mold opening actuation (field 714) has cause the mold halves 102, 104 separate by 10.0 mm (field 716). The rule specified in row 706 can be considered to protect the ejector 154 from colliding or otherwise interfering with opposing mold half 102 before the mold has been opened sufficiently.

To define rule 706, a user interacting with GUI 700 may have initially selected an "Add Rule" button 750 (or a similar GUI construct), which may have caused row 706, initially blank, to be added to the table 704. The user may have thereafter employed the user input mechanism of HMI 40 to specify the values shown in fields 710, 712, 714, and 716 of FIG. 7. For example, the first field 710 specifies a particular state of the current machine component actuation that is relevant for the current rule. The second field 712 specifies an operator ("AFTER") defining a temporal relationship between attainment of the relevant state of the current machine component actuation and attainment of the state defined in field 716 of the other machine component actuation (as specified in field 714) for avoiding interference between the two components.

In the illustrated embodiment, pull-down menu buttons 718, 720 (FIG. 7) are used to facilitate specification of values in fields 712, 714 respectively from prepopulated lists. The prepopulated list for field 712 may include the values "BEFORE," "AFTER" and "AT." The prepopulated list for field 714 may include a set of distinct actuations of components of molding machine 100 besides the machine component actuation identified in the title bar 702. The machine component actuations presented in a prepopulated list may be context-specific, e.g. may appear in the list only if the actuation is relevant to (is possible in conjunction with) the current machine component actuation. The use of prepopulated lists may enhance usability but is not absolutely required.

It will be appreciated that, in GUI 700, the state of each machine component actuation is expressed as, or with reference to, a position (e.g. 1.0 mm, 10.0 mm) of the relevant machine component (e.g. ejector 154, mold half 104). In the illustrated example, the position is expressed as an offset from a reference position (e.g. a start or molding position) of the relevant molding machine component. However, the state of each machine component actuation may be specified in other ways in alternative embodiments. For example, a machine component's state could be expressed relative to the activation state of one or more proximity switches. In a specific example, a core slider component of another molding machine could have respective proximity switches for each of a "back" position, a "forward" position, and an intermediate position between the two. A controller could monitor signals from the proximity switches to determine machine component actuation state. In a corresponding GUI, each of the distinct positions could be expressed using a respective unique textual identifier, e.g. "back," "forward," or "intermediate." Alternatively, machine component actuation state could be specified in terms of elapsed time from the time an actuation command was issued. For example, a machine component may be considered to have achieved a predetermined state (e.g. being in a "forward" position) if the actuation signal for moving the component in a particular direction or trajectory has been on for a predetermined period of time (e.g. one second). The GUI in such an embodiment could reference the predetermined states using unique textual identifiers or using an elapsed time since actuation was commenced.

The second row 708 of FIG. 7 similarly specifies a rule whereby, to prevent interference between the ejector 154 and opposing mold half 102 at a later stage of mold opening, the chosen machine component actuation (ejector forward, as specified in title bar 702) should be completed (as specified in field 730) AFTER (field 732, as chosen from a prepopulated list using pulldown button 738) the mold opening actuation (field 734, as chosen from a prepopulated list using pulldown button 740) has caused mold halves 102, 104 to separate by 60.0 mm (field 736). The rule specified in row 708 may be considered to protect the ejector 154 from colliding or otherwise interfering with opposing mold half 102 at a later stage of mold opening than the rule defined in the first row 706.

Although not expressly shown in FIG. 7, additional rules pertaining to actuations of other machine components (e.g. extension and/or retraction of the in-mold closing device 106) could be specified in table 704.

If removal of a rule from table 704 were desired, the user could select the corresponding row within the table 704 followed by the "Remove Rule" button 752 (or a similar GUI construct). Selection of the "Cancel" button 754 may permit the GUI 700 to be exited without any change to a current configuration of the protection device.

Figure 9:
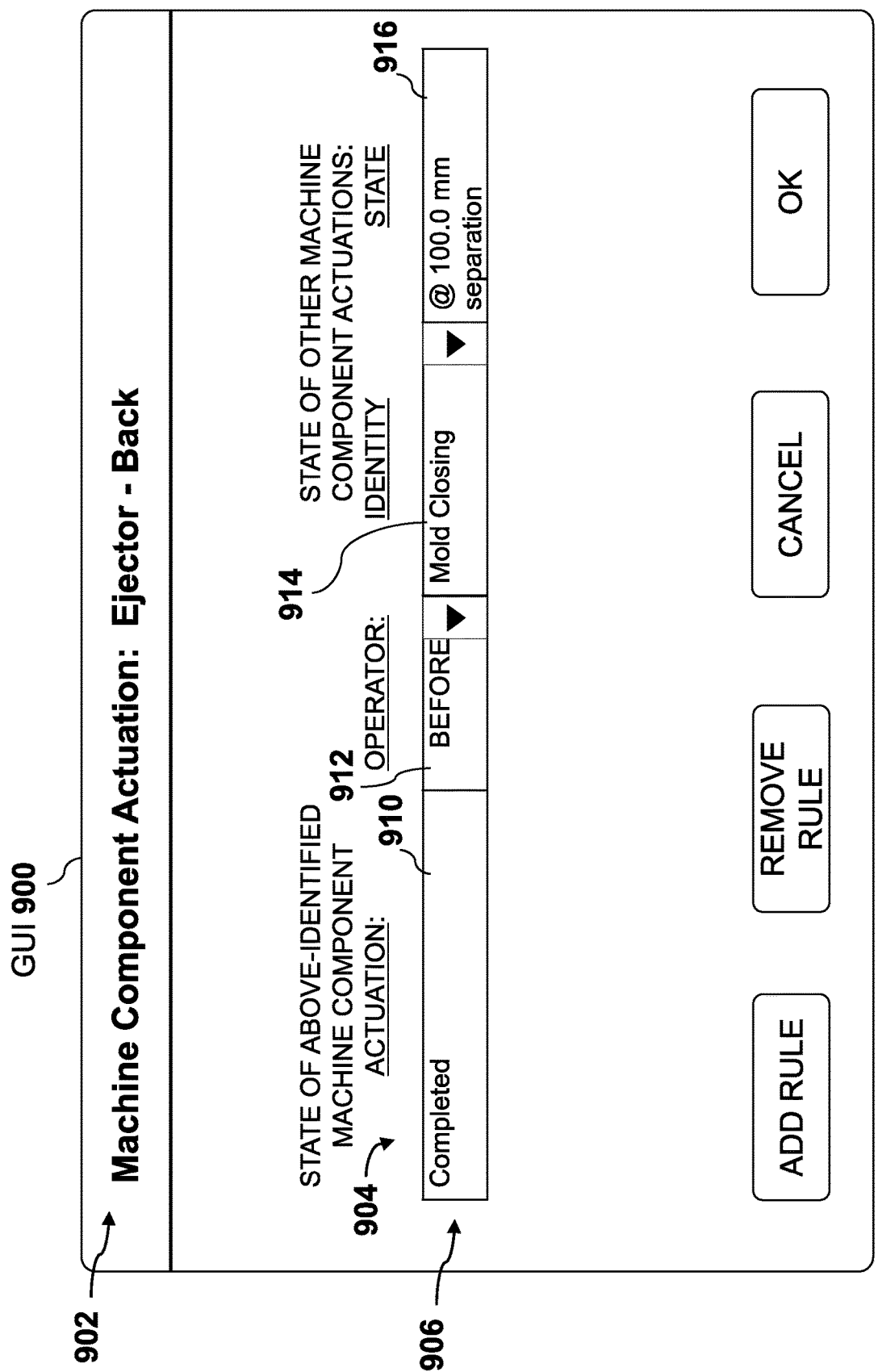
FIGS. 9, 10 and 11 illustrate further example graphical user interfaces that may be presented by the human-machine interface of the system of FIG. 1 during the operation of FIG. 6.
Figure 10:
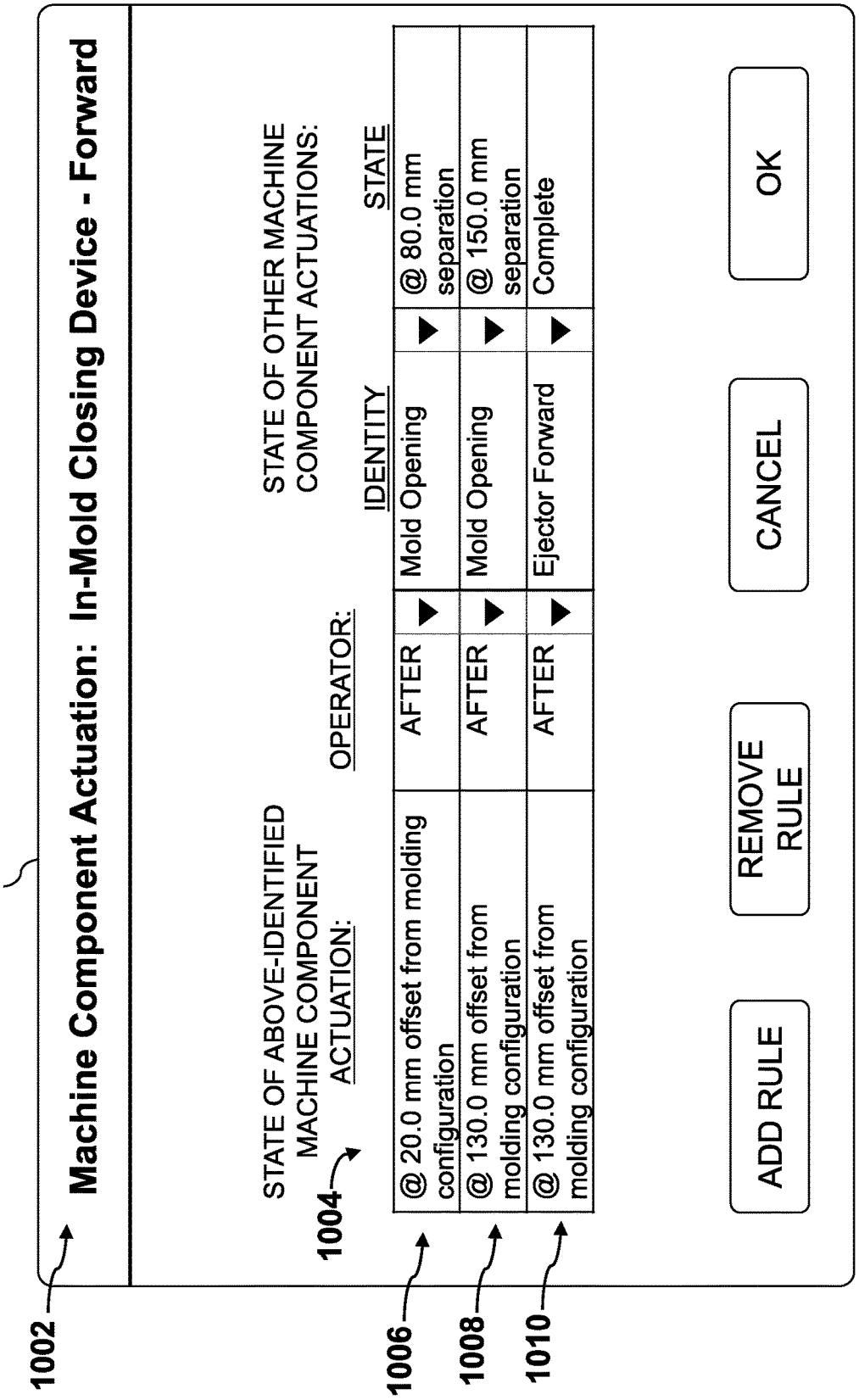
Figure 11:
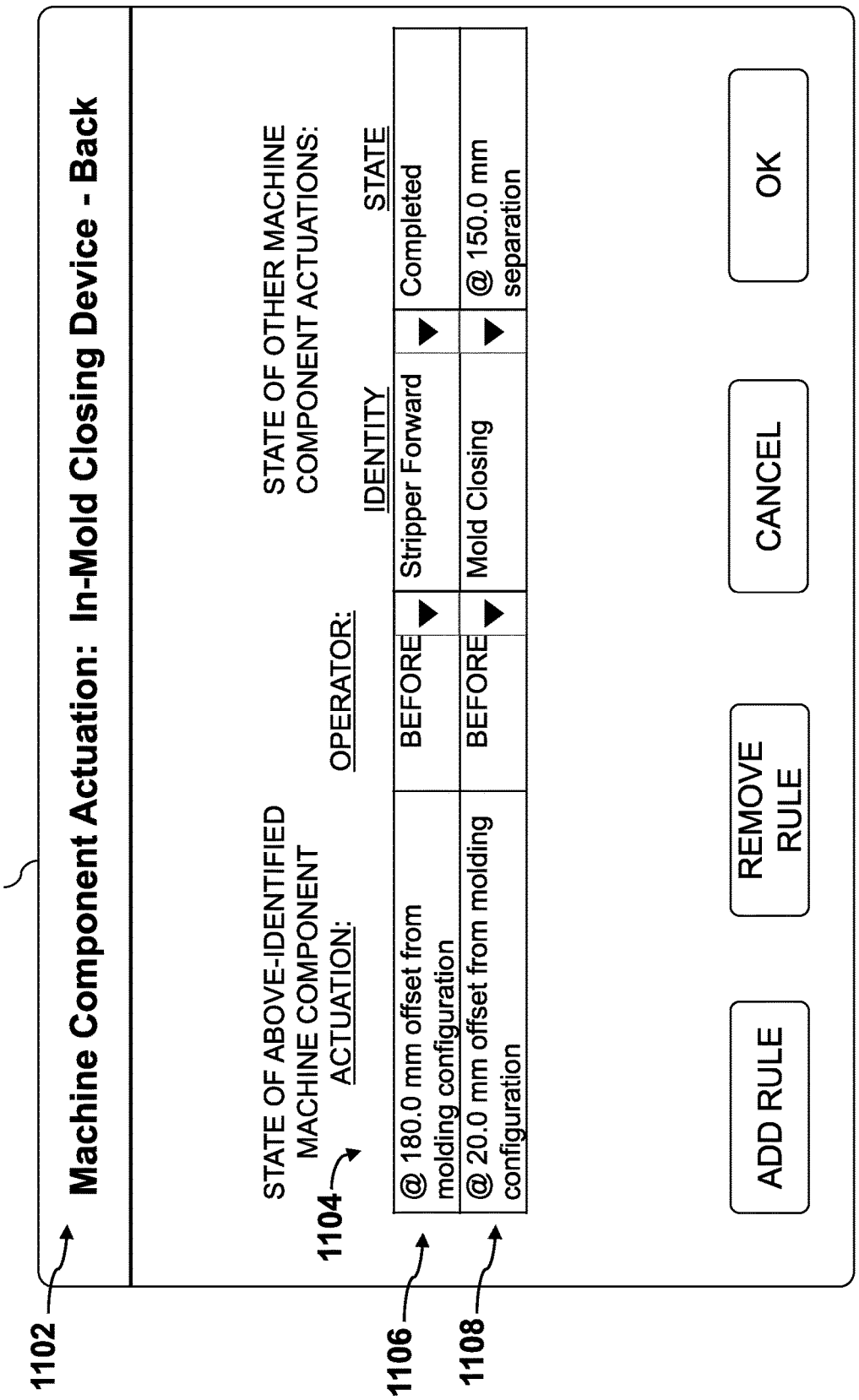

Additional GUIs may be used to define rules specific to other machine component actuations (e.g. as shown in FIGS. 9-11, described below).

Thereafter, based on the rules defined within the GUI 700 (and possibly other GUIs, such as GUIs 900, 1000, and 1100 of FIGS. 9, 10 and 11 respectively, described below), the controller 50 is configured to, upon violation of any one of the rules, trigger an action for reducing a risk of interference between the chosen machine component actuation and a respective one of the other machine component actuations (operation 606, FIG. 6). In the present embodiment, operation 606 may be initiated after user selection of the "OK" button 756 of FIG. 7, or a similar construct. Operation 606 may occur in two stages, which are not expressly shown in FIG. 6.

In a first stage of operation 606, the machine protection constraints 42 (rules) defined by the GUI(s) are communicated to the controller 50. In the present embodiment, the machine protection constraints 42 take the form of a data structure 800 generated by the HMI software 88 (FIG. 5) responsive to user input.

Referring to FIG. 8, the data structure 800 is schematically depicted as a series of tables. The first table 802 is understood to contain all of the other tables and thus notionally represents the entirety of data structure 800. Each of the remaining four tables 820, 840, 860 and 880 represents a subordinate element of data structure 800, which may itself be a (subordinate) data structure.

The containing table 802 has six rows, each representing a distinct machine component actuation of molding machine 100. Table 802 may be implemented as an array of structures (records) for example, where each structure in the array corresponds to one row of the table 802. The table 802 may include additional rows for actuations of other components of molding machine 100 (e.g. stripper ring 124) that are not expressly shown.

The columns of table 802 represent fields. The first field (first column) contains unique identifiers for each distinct machine component actuations. The second field (second column) identifies the relevant machine component. The third field (third column) identifies the relevant actuation of the component identified in the second field. The second and third fields could be implemented as enumerated types for example. The fourth field (fourth column) contains machine protection constraints (rules) for the machine component actuation represented by the row. The fourth field may for example be implemented as a subordinate or nested data structure, e.g. an array of structures (records). In this example, the fourth field of table 802 contains, in the first four rows of table 802, data structures represented by tables 820, 840, 860 and 880 respectively.

Each of tables 820, 840, 860 and 880 represents data entered using a respective one of GUIs 700, 900, 1000 and 1100, i.e. corresponds to a distinct machine component actuation (referred to herein as the "current" machine component actuation). Each row in one of these tables represents a distinct rule regarding a permissible state of the current machine component actuation, relative to another machine component actuation, for avoiding interference between the machine component actuations (between components and/or associated molded articles).

The four tables 820, 840, 860 and 880 adopt a uniform structure in which columns represent fields. The first field (first column) contains unique identifiers for each distinct rule in any of the tables 820, 840, 860 or 880. The second "Own State" field (second column) indicates how the state of the current machine component actuation is characterized. This field may for example be implemented as an enumerated type, e.g. whose value may be one of "Position" (meaning that the state is characterized as a position relative to a reference position), "Proximity" (meaning that the state is characterized in reference to the activation of a proximity switch), or "Completed" (meaning that the state is characterized as completion of the relevant machine component actuation). The third "Own Position" field (third column) contains a value representing a position (e.g. a real number representing millimeters of offset from a reference position) in cases where the value of the second "Own State" field is "Position." The fourth "Operator" field (fourth column) contains an operator (e.g. "After" or "Before") defining a temporal relationship between attainment of the current machine component actuation state and attainment of the state of the other machine component actuation defined by the fifth, sixth and seventh fields (described below) for avoiding interference between the two machine component actuations. The fifth "Other Component—Actuation" field identifies the other machine component actuation that is relevant to the rule represented by the row. The fifth field could for example be implemented as a pointer to one of the unique rows of table 802. The sixth and seventh "Other State" and "Other Position" fields respectively are analogous to the "Own State and "Own Position" fields described above, but pertain to the other machine component actuation rather than the current machine component actuation. Each of the tables 820, 840, 860 and 880 may for example be implemented as an array of structures, where each row in one of the tables corresponds to a single structure within the array.

The generated data structure 800 may then be communicated from HMI 40 to controller 50 via operative coupling 60 (FIG. 1). Depending upon the embodiment, this communication may use a communication protocol or method such as the TCP/IP protocol, shared memory, serial communications, and/or an industrial communications bus protocol such as Modbus™, Profinet™, or OPC™, to name but a few examples. In some embodiments, the data structure may be bundled or packaged with instructions defining a complete machine sequence (e.g. an injection molding cycle) before it is communicated to the controller 50. The instructions may for example be expressed using a high level language for programmable logic controllers, such as IEC 61131-3 structured text.

In a second stage of operation 606, the controller 50 may use data structure 800 to configure itself to effect the rules specified in table 704 (FIG. 7). In an example embodiment, the controller 50 may do so by performing the following operations upon receipt of data structure 800. First, the controller 50 may store the data structure 800 with other data structures that is uses to run the molding machine 100. Next, the data structure 800 may be processed by a controller program, and other supporting data structures may be generated. Then, the controller 50 may use the new data structures and its logic to evaluate machine component states, generate commands for different machine component actuators, and evaluate and enforce the machine protection constraints defined using the GUIs 700, 900, 1000 and 1100. If any rule is violated, the controller 50 may trigger an action for reducing a risk of interference between the machine component actuations.

In some embodiments, the action that is triggered by the controller 50, upon violation of any of the rules of table 704, is an interruption of an actuation sequence of the machine components at the injection molding machine 100 (e.g. interrupting an injection molding cycle). In some embodiments, the action that is triggered by the controller 50, upon violation of any of the rules of table 704, is the generation of a user notification at the HMI 40. In one example, the user notification may be a textual message such as "Ejector forward verification failed (Mold stroke 10.0 mm)." The user notification may include additional information or instructions, possibly in the form of text, images, or video.

Operation 600 of FIG. 6 is thereby concluded.

It will be appreciated that defining molding machine protection rules using a GUI that is specific not only to a particular machine component, but also to a particular actuation of that machine component, may afford various benefits. A first possible benefit is that permissible relationships between machine component actuations may be defined differently for different directions or types of actuations of the same component (e.g. movement forward versus movement backward), possibly to account for asymmetric machine component actuations in opposing directions (see e.g. FIGS. 7 and 9, defining distinct rules for "Ejector—Forward" and "Ejector—Back," and FIGS. 10 and 11, defining distinct rules for "In-Mold Closing Device—Forward" and "In-Mold Closing Device—Back"). Another benefit is that machine protection constraints may be defined differently based on the relative motion between two machine components, which may differ significantly, e.g. in the case when one of the components is moving towards the other versus away from the other.

Another benefit is that the GUI may provide a convenient "at a glance" view of all machine protection constraints relevant to a particular machine component actuation. Additionally, the likelihood of correctly expressing machine protection constraints may be improved, e.g. in comparison to historical methods of defining molding machine protection rules (e.g. using IEC 61131-3), because the GUI may be more readily comprehensible and intuitive to the human operator and may demand fewer skills to use. The GUI may also beneficially allow many relationships (rules) between machine component actuations to be defined without having to consider unrelated machine component actuations, thereby achieving a good compromise between flexibility and simplicity.

Another GUI 900 that may be presented in operation 602 for another machine component actuation is depicted in FIG. 9. The example GUI 900 is specific to actuation of ejector 154 in the reverse (backward) direction (see text in title bar 902).

As illustrated, the first row 906 of table 904 in FIG. 9 specifies a rule whereby, to prevent interference between the ejector 154 and opposing mold half 102 during mold closing, the chosen machine component actuation (ejector back) should be completed (as specified in field 910) BEFORE (field 912) the mold closing actuation (field 914) has attained a separation distance of 100.0 mm between mold halves 102 and 104 (field 916).

Yet another example GUI 1000 that may be presented in operation 602 for another machine component actuation is depicted in FIG. 10. The example GUI 1000 is specific to actuation of in-mold closing device 106 (FIG. 1) in the forward direction (see text in title bar 1002).

The first row 1006 of table 1004 in FIG. 10 specifies a first rule whereby, to prevent interference between the forward-moving in-mold closing device 106 and the movable mold half 104 during mold opening, the in-mold closing device 106 should be positioned at an offset of 20.0 mm, from a reference position (e.g. a molding configuration), AFTER the mold opening actuation has cause the mold halves 102, 104 to separate by 80.0 mm.

The second row 1008 of table 1004 in FIG. 10 specifies a second rule whereby, to prevent interference between the forward-moving in-mold closing device 106 and the movable mold half 104 during mold opening, the in-mold closing device 106 should be positioned at an offset of 130.0 mm, from the reference position, AFTER the mold opening actuation has cause the mold halves to separate by 150.0 mm.

The third row 1010 of table 1004 in FIG. 10 specifies a third rule whereby, to prevent interference between the forward-moving in-mold closing device 106 and ejector 154 during mold opening, the in-mold closing device 106 should be positioned at an offset of 130.0 mm, from the reference position, AFTER the ejector has completed its forward motion.

A final example GUI 1100 that may be presented in operation 602 for another machine component actuation is depicted in FIG. 11. The example GUI 1100 is specific to actuation of in-mold closing device 106 (FIG. 1) in the backward direction (see text in title bar 1102).

The first row 1106 of table 1104 in FIG. 11 specifies a first rule whereby, to prevent interference between the backwardly moving in-mold closing device 106 and forwardly moving stripper ring 124, the in-mold closing device 106 should be positioned at an offset of 180.0 mm, from its reference, BEFORE the stripper ring forward actuation is complete.

The second row 1108 of table 1104 in FIG. 11 specifies a second rule whereby, to prevent interference between the backwardly moving in-mold closing device 106 and the movable mold half 104 during mold closing, the in-mold closing device 106 should be positioned at an offset of 20.0 mm, from the reference position, BEFORE the mold closing actuation has cause the mold halves to achieve a separation distance of 150.0 mm.

It will be appreciated that techniques similar to those described above may be used to define machine protection constraints for actuatable components of molding machines besides those specifically recited above, such as mold cores movable into multiple positions during a single molding cycle or take-off devices used to remove and cool freshly molded articles.

Various alternative embodiments are possible.

For example, although the various example of machine component actuations described herein primarily result in translation of machine components through three-dimensional space, it will be appreciated that actuation need not be limited to translation-type movement. For example, machine component actuation in alternative embodiments may impart rotational movement to the respective machine components, possibly in combination with translation-type movement.

In the example GUIs 700, 900, 1000 and 1100, rules are expressed using table rows. In alternative embodiments, rules may be expressed using different UI constructs, e.g. using graphical icons representing machine component actuations and sliders for setting threshold positions, a text-based natural language that is parsed, or others.

In the foregoing descriptions, some machine component actuation states are described using positions (e.g. 10.0 mm) that, as noted above, are offsets from a reference position. In some embodiments, the reference position may be 0, in which case the states may be considered to be expressed as absolute positions.

It is not required for the protection device (e.g. controller) to be configured to implement machine protection constraints by interpreting or parsing a data structure (e.g. data structure 800) communicated from the HMI. The protection device could be configured to implement machine protection constraints in other ways, e.g. by receiving, from the HMI, a program governing the overall operation of molding machine 100, within which the machine protection constraints are incorporated or subsumed. Such a program could for example be encoded using a programming language such as IEC 61131-3 or a similar language.

All of the illustrated embodiments are specific to injection molding machines. It will be appreciated that, in alternative embodiments, the molding machine 100 may be something other than an injection molding machine, such as a compression molding machine, an injection-compression molding machine, or a blow-molding machine.

Other variations are possible within the scope of the claims.

What is claimed is:

1. A system comprising:
    a computing device with a controller for actuating a plurality of actuators of a molding machine in an actuation sequence, each distinct actuation of one of the actuators during the actuation sequence constituting a respective machine component actuation of an associated machine component; and
    a display device with a human-machine interface 'HMI', wherein the HMI is operable to:
        present a graphical user interface 'GUI' specific to a chosen machine component actuation; and
        for each of a plurality of other machine component actuations, define within the GUI, based on operator input, a rule specifying a state of the chosen machine component actuation relative to a state of the other machine component actuation for preventing interference between the two machine component actuations;
    wherein the controller is configured, based on the rules defined within the GUI, to trigger an action, upon violation of any one of the rules, for reducing a risk of interference between the chosen machine component actuation and a respective one of the other machine component actuations, wherein each rule specifies a temporal relationship between the state of the chosen machine component actuation and the state of the other machine component actuation for preventing interference between two machine component actuations, wherein the temporal relationship is expressed using a BEFORE or AFTER operator.

2. The system of claim 1 wherein the action is interrupting the actuation sequence.

3. The system of claim 1 wherein the action is generating a user notification at the HMI.

4. The system of claim 1 wherein the GUI comprises a table and wherein each rule is represented as a row within the table.

5. The system of claim 1 wherein the state of the chosen machine component actuation is expressed, within the GUI, as a position of the associated machine component actuated by the chosen machine component actuation.

6. The system of claim 5 wherein the position of the associated machine component is expressed as an offset from a reference position of the machine component.

7. The system of claim 1 wherein the state of the other machine component actuation is expressed, within the GUI, as a position of the associated machine component actuated by the other machine component actuation.

8. The system of claim 7 wherein the position of the associated machine component is expressed as an offset from a reference position of the other machine component.

9. The system of claim 1 wherein the state of the chosen machine component actuation or the state of the other machine component actuation is expressed, within the GUI, as completed.

10. The system of claim 1 wherein the molding machine is an injection molding machine and wherein the plurality of other machine component actuations are selected from a set of machine component actuations comprising:
    mold opening;
    mold closing;
    ejector forward;
    ejector back;
    stripping device forward;

stripping device back;
take-off device forward;
take-off device back;
mold core moving from a first molding position to a second molding position; and
mold core moving from the second molding position to the first molding position.

11. The system of claim 1 wherein the HMI is operable to present a GUI specific to each of a plurality of chosen machine component actuations and, in respect of each chosen machine component actuation, define within the GUI, based on operator input, a machine protection constraint in the form of a rule specifying a state of the chosen machine component actuation relative to a state of each of a plurality of other machine component actuations for preventing interference between the chosen machine component actuation and the other machine component actuation.

12. The system of claim 1 wherein each rule is a machine protection constraint in the form of a distinct rule.

13. The system of claim 12 wherein the distinct rules take the form of a data structure.

14. The system of claim 13, wherein:
the data structure comprises a plurality of fields;
the HMI is operable to communicate the data structure to the controller via an operative coupling; and
the controller is arranged to use the data structure to configure itself to effect the rules specified in the data structure.

15. The system of claim 14, wherein the data structure comprises a plurality of subordinate data structures each representing the rules associated with one of the chosen machine component actuations.

16. The system of claim 15, wherein the controller is further configured to perform the following operations:
store the data structure with other new data structures that are used to run the molding machine;
process the data structure by a controller program to generate other supporting data structures;
use the new data structures and a logic of the controller to evaluate machine component states;
generate commands for different machine component actuators; and
evaluate and enforce the machine protection constraints defined using the GUI.

17. A method of programming a controller for a molding machine, the controller for actuating a plurality of actuators of the molding machine in an actuation sequence, each distinct actuation of one of the actuators during the actuation sequence constituting a respective machine component actuation, the method comprising:
presenting a graphical user interface 'GUI' specific to a chosen machine component actuation;
for each of a plurality of other machine component actuations, defining within the GUI, based on operator input, a rule specifying a state of the chosen machine component actuation relative to a state of the other machine component actuation for preventing interference between the two machine component actuations; and
configuring the controller, based on the rules defined within the GUI, to trigger an action, upon violation of any one of the rules, for reducing a risk of interference between the chosen machine component actuation and a respective one of the other machine component actuations, wherein each rule specifies a temporal relationship between the state of the chosen machine component actuation and the state of the other machine component actuation for preventing interference between two machine component actuations, wherein the temporal relationship is expressed using a BEFORE or AFTER operator.

18. The method of claim 17 wherein the action is interrupting the actuation sequence.

19. The method of claim 17 wherein the action is generating a user notification.

20. The method of claim 17 wherein the GUI comprises a table and wherein each rule is represented as a row within the table.

21. The method of claim 17 wherein the state of the chosen machine component actuation is expressed, within the GUI, as a position of the associated machine component actuated by the chosen machine component actuation.

22. The method of claim 21 wherein the position of the associated machine component is expressed as an offset from a reference position of the machine component.

23. The method of claim 17 wherein the state of the other machine component actuation is expressed, within the GUI, as a position of the associated machine component actuated by the other machine component actuation.

24. The method of claim 23 wherein the position of the associated machine component is expressed as an offset from a reference position of the other machine component.

25. The method of claim 17 wherein the state of the chosen machine component actuation or the state of the other machine component actuation is expressed, within the GUI, as completed.

26. The method of claim 17 wherein each rule is a machine protection constraint in the form of a distinct rule.

27. The method of claim 26 wherein the distinct rules take the form of a data structure.

28. A non-transitory computer-readable medium storing instructions that, when executed by a processor of a computing device (80) associated with a controller of a molding machine, the controller operable to actuate a plurality of actuators of the molding machine in an actuation sequence, each distinct actuation of one of the actuators during the actuation sequence constituting a respective machine component actuation, cause the processor to:
present a graphical user interface 'GUI' specific to a chosen machine component actuation;
for each of a plurality of other machine component actuations, define within the GUI, based on operator input, a rule specifying a state of the chosen machine component actuation relative to a state of the other machine component actuation for preventing interference between the two machine component actuations; and
configure the controller, based on the rules defined within the GUI, to trigger an action, upon violation of any one of the rules, for reducing a risk of interference between the chosen machine component actuation and a respective one of the other machine component actuations, wherein each rule specifies a temporal relationship between the state of the chosen machine component actuation and the state of the other machine component actuation for preventing interference between two machine component actuations, wherein the temporal relationship is expressed using a BEFORE or AFTER operator.

29. The non-transitory computer-readable medium of claim 28 wherein the controller is part of the computing device.

* * * * *